United States Patent
Goode et al.

(10) Patent No.: US 6,726,748 B2
(45) Date of Patent: Apr. 27, 2004

(54) METHOD OF CONVERTING A DOWNFLOW/UPFLOW WET FLUE GAS DESULFURIZATION (WFGD) SYSTEM TO AN UPFLOW SINGLE-LOOP WFGD SYSTEM

(75) Inventors: Ronald L. Goode, Canal Fulton, OH (US); Dennis W. Johnson, Barberton, OH (US); David W. Murphy, Cuyahoga Falls, OH (US); Robert B. Myers, Norton, OH (US); John F. Sulek, Barberton, OH (US); David R. Burley, Akron, OH (US); Paul J. Lieb, Norton, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 83 days.

(21) Appl. No.: 10/196,597

(22) Filed: Jul. 16, 2002

(65) Prior Publication Data

US 2004/0011200 A1 Jan. 22, 2004

(51) Int. Cl.⁷ ................................................ B01D 47/06
(52) U.S. Cl. .......................... 95/199; 29/401.1; 95/224; 95/235
(58) Field of Search .......................... 29/401.1, 890.09, 29/890.11; 95/235, 149, 199, 201, 224; 96/234, 243, 271, 273, 275, 277, 322

(56) References Cited

U.S. PATENT DOCUMENTS

| | | | |
|---|---|---|---|
| 3,420,508 A | | 1/1969 | Hurst et al. |
| 3,456,709 A | * | 7/1969 | Vegeby |
| 3,758,668 A | | 9/1973 | Lapple et al. |
| 3,788,043 A | * | 1/1974 | Dorr et al. |
| 3,944,401 A | * | 3/1976 | Dorr et al. |
| 3,995,006 A | | 11/1976 | Downs et al. |
| 4,040,803 A | * | 8/1977 | Atsukawa et al. |
| 4,110,088 A | * | 8/1978 | Cold et al. |
| 4,263,021 A | | 4/1981 | Downs et al. |
| 5,209,905 A | | 5/1993 | Onizuka et al. |
| 5,246,471 A | * | 9/1993 | Bhat et al. |
| 5,281,402 A | | 1/1994 | Gohara et al. |
| 5,451,250 A | | 9/1995 | Gohara et al. |
| 5,512,072 A | * | 4/1996 | Laslo |
| 5,656,046 A | | 8/1997 | Gohara et al. |
| 5,756,058 A | * | 5/1998 | Watanabe et al. |
| 6,036,756 A | * | 3/2000 | Gohara et al. |
| 6,149,137 A | | 11/2000 | Johnson et al. |
| 6,267,358 B1 | * | 7/2001 | Gohara et al. |
| 6,488,899 B1 | * | 12/2002 | Gohara et al. |

OTHER PUBLICATIONS

*Steam*, Its Generation and Use, 40th Edition, The Babcock & Wilcox Company, ©1992, p. 35–1 to 35–11.
Electric Utility Engineer's FGD Manual vol. I—FGD Process Design, Final Report, Radian International, Mar. 4, 1994, p. 1.4.2.1–1 to 1.4.3–5.

* cited by examiner

*Primary Examiner*—Duane S. Smith
(74) *Attorney, Agent, or Firm*—Kathryn W. Grant; Eric Marich

(57) ABSTRACT

A method of reducing the pressure drop in a downflow/upflow wet flue gas desulfurization (WFGD) system and of improving overall sulfur dioxide collection efficiency by converting the downflow/upflow WFGD system to an upflow single-loop WFGD system. The method includes the replacing of the downflow quencher and related duct work with a bypass for connecting the incoming flue gas duct with the upflow absorber, and the adding of a quenching zone in the absorber comprised of spray headers.

15 Claims, 3 Drawing Sheets

METHOD OF CONVERTING A DOWNFLOW/ UPFLOW WET FLUE GAS DESULFURIZATION (WFGD) SYSTEM TO AN UPFLOW SINGLE-LOOP WFGD SYSTEM

BACKGROUND OF THE INVENTION

1. Field of the Invention

The present invention relates, in general, to wet flue gas desulfurization (WFGD) systems and, in particular, to a new and useful method of reducing the pressure drop in a downflow/upflow WFGD system and improving its collection efficiency by converting it to an upflow single-loop WFGD system.

2. Description of the Related Art

The desulfurization of flue gas, particularly flue gas from power plants, has been the subject of considerable study. Air quality laws, both at the federal and state level, have set increasingly stringent emission standards especially for such known pollutants as sulfur oxides. Because coal and oil-fired electrical power generating plants can discharge large quantities of sulfur oxides as combustion by-products, much effort has focused on the desulfurization of flue gas to reduce power plant sulfur dioxide emissions to permissible levels.

Thus, sulfur oxides, principally present as sulfur dioxide, are found in the flue gases discharged by coal and oil-fired and other fossil fuel-fired electrical power generating plants, refuse-to-energy plants, and the waste gases from other industrial processes. In addition, sulfur-containing gases, notably sulfur dioxide, may be formed in the partial combustion or gasification of sulfur-containing fuels, such as coal or petroleum residuals. The control of air pollution resulting from the discharge of sulfur dioxide into the atmosphere has thus become increasingly urgent.

The most common flue gas desulfurization process used with coal and oil-fired electrical generating power plants is known as "wet scrubbing". In this process the sulfur dioxide-containing flue gas is scrubbed with an aqueous alkaline solution or slurry reagent comprised of lime, limestone, soda ash, or other chemicals including sodium, magnesium and calcium compounds and may include any number of additives to enhance removal, control chemistry, and reduce chemical scale.

The technology for wet scrubbing provides gas-liquid contact in a number of differently configured systems. One of the more prominent of these systems is comprised of a downflow quencher and an upflow absorber. The hot flue gas to be treated enters the quencher which is equipped with a venturi scrubber or spray headers connected to a slurry or water source to produce droplets that promote rapid cooling of the hot flue gas as it flows downwardly through the quencher. After leaving the quencher, the cooled flue gas discharges into a lateral passageway and flows therethrough and then upwardly through the absorber where it is scrubbed with an alkaline slurry reagent where the gas flow is countercurrent to and in intimate contact with the slurry reagent. The slurry reagent is introduced into the absorber through spray header nozzles and flows over packing or trays. Mist eliminators are included near the absorber outlet to remove additional moisture from the flue gas.

While the downflow/upflow WFGD system generally provides the sulfur dioxide removal effect, it experiences a pressure loss higher than that of a contemporary single-loop WFGD system of the same capacity. It, then, follows that the downflow/upflow WFGD system requires more fan power and more pump power than the single-loop WFGD system. This, in turn, increases the operating and maintenance costs of a downflow/upflow WFGD system when compared to a single-loop WFGD system of the same capacity.

In other words, the present invention makes it possible to decrease the flow resistance of the flue gas and thereby reduce the operating and maintenance costs.

As noted, the trend in pollution control has been towards increased stringency, such that many facilities face the need to upgrade or retrofit their existing pollution control equipment to achieve better performance. In addition owners/ operators are often interested in upgrading or retrofitting existing pollution control equipment to realize the benefit of lower operational and maintenance costs from improved efficiency. In many situations, the retrofitting or upgrading of an air pollution control system is difficult due to space and/or power consumption considerations. A benefit of the present invention is that it addresses both of these conditions by conforming the retrofit to the existing space and by lowering fan power and pump power requirements through a decrease in pressure loss across the pollution control system, and improved effectiveness in the removal of sulfur dioxide from the flue gases. The present invention can provide pressure drop reductions across the system of about 5 inches water gage.

SUMMARY OF THE INVENTION

The present invention provides a method of reducing the pressure drop in a downflow/upflow WFGD system by converting it to an upflow single-loop WFGD system. The downflow/upflow system includes a downflow quencher and an upflow absorber and a lateral flow passageway therebetween. The downflow quencher is comprised of a venturi scrubbing device mounted in the duct work used to convey the incoming flue gas through the quencher for discharge into the lateral passageway for flow therethrough to the absorber. As a practical matter, venturi scrubbing devices, even those claimed to utilize very fine droplets, actually utilize droplets which are much larger than the optimal size. The primary methods heretofore utilized in improving the collection efficiency of a venturi scrubber have been to decrease the size of the throat or to increase the overall rate at which gas flows through the system. Both of these methods increase the differential velocities between the contaminant particles and the liquid droplets as they pass through the throat of the venturi scrubber This causes more interactions between particles and droplets to occur, thereby improving contaminant removal. However, increasing the collection efficiency in this manner comes at a cost of significantly higher energy input into the system, thereby resulting in higher operating costs. The extra energy is expended due either to the increased overall resistance attributable to the reduced throat diameter or to the increased overall gas flow rate through the venturi scrubber. In either case, the pressure drop across the venturi is increased and greater fan and pumping capacity is required.

The method according to the present invention replaces the duct work, the quencher and, except for an alternate embodiment hereinafter described, the lateral passageway with a bypass that conveys the incoming flue gas directly to the absorber. The quenching zone is transferred to the absorber and replaced by a spray level. The spray level includes a plurality of spray nozzles mounted on headers arranged parallel to one another. The nozzles spray an aqueous slurry of sulfur dioxide-reducing reagent within the spray zone to contact the flue gas while descending through the absorber counter-currently to the flow of flue gas, the slurry reagent is collected in the absorber sump or reaction tank and a portion of it is recycled for contact with the flue gas flowing through the absorber. The piping used to supply the slurry reagent to the quencher in the replaced duct work may be rerouted to the spray nozzle headers located in the absorber. The replacement of the bypassed quencher with a level of spray nozzles improves overall sulfur dioxide removal from the flue gases flowing through the system. An awning is mounted over the absorber inlet to prevent the slurry reagent from entering the inlet, and to initially deflect the incoming flue gas in a downward direction thereby achieving a more uniform distribution of the flue gas in its upward flow through the absorber. The bypass is configured to have a lesser number of turns than the duct work thereby reducing pressure losses. The front wall of the absorber is extended below the absorber inlet and becomes the front wall of the sump so as to accommodate the replacement of the lateral passageway with the bypass and the connecting of the bypass with the absorber. An overflow conduit is added to the front wall of the sump to maintain a desired or preset level of slurry reagent and contaminant particles in the sump, with any excess slurry reagent and contaminant particles being discharged through downcomers to a holding tank. The bypass, the awning, and the front wall of the sump are fabricated from alloys that are corrosion-resistant to both oxidizing and reducing media, and are resistant to localized corrosion attack.

An optional standby quencher may also be provided in the bypass for emergency use.

Flow guide elements may be mounted in the bypass such as turning vanes around corners so as to promote laminar flow of the flue gases, particularly around sharp corners in the duct work, and thus further reduce pressure losses.

The lateral passageway need not be replaced, provided that it is restructured in that its flue gas inlet opening located on the roof is closed off and replaced by a flue gas inlet opening on the front wall. The bypass is then connected to the portion of the passageway front wall bordering the relocated flue gas inlet opening. A set of headers and nozzles may have to be added on the gas side of the passageway roof as part of the restructuring so as to provide a spray of alkaline solution to primarily prevent the overheating of the roof.

It should be noted that removal of the duct work and the venturi scrubber type quencher will not only reduce fan power and pump power requirements due to reduced pressure drop across the system, but also result in the elimination of the costly maintenance associated with the venturi scrubber throat.

BRIEF DESCRIPTION OF THE DRAWINGS

The invention will be better understood and its advantages will be more appreciated from the following detailed description, especially when read in light of the accompanying drawings, wherein.

DESCRIPTION OF THE PREFERRED EMBODIMENTS

Figure 1:
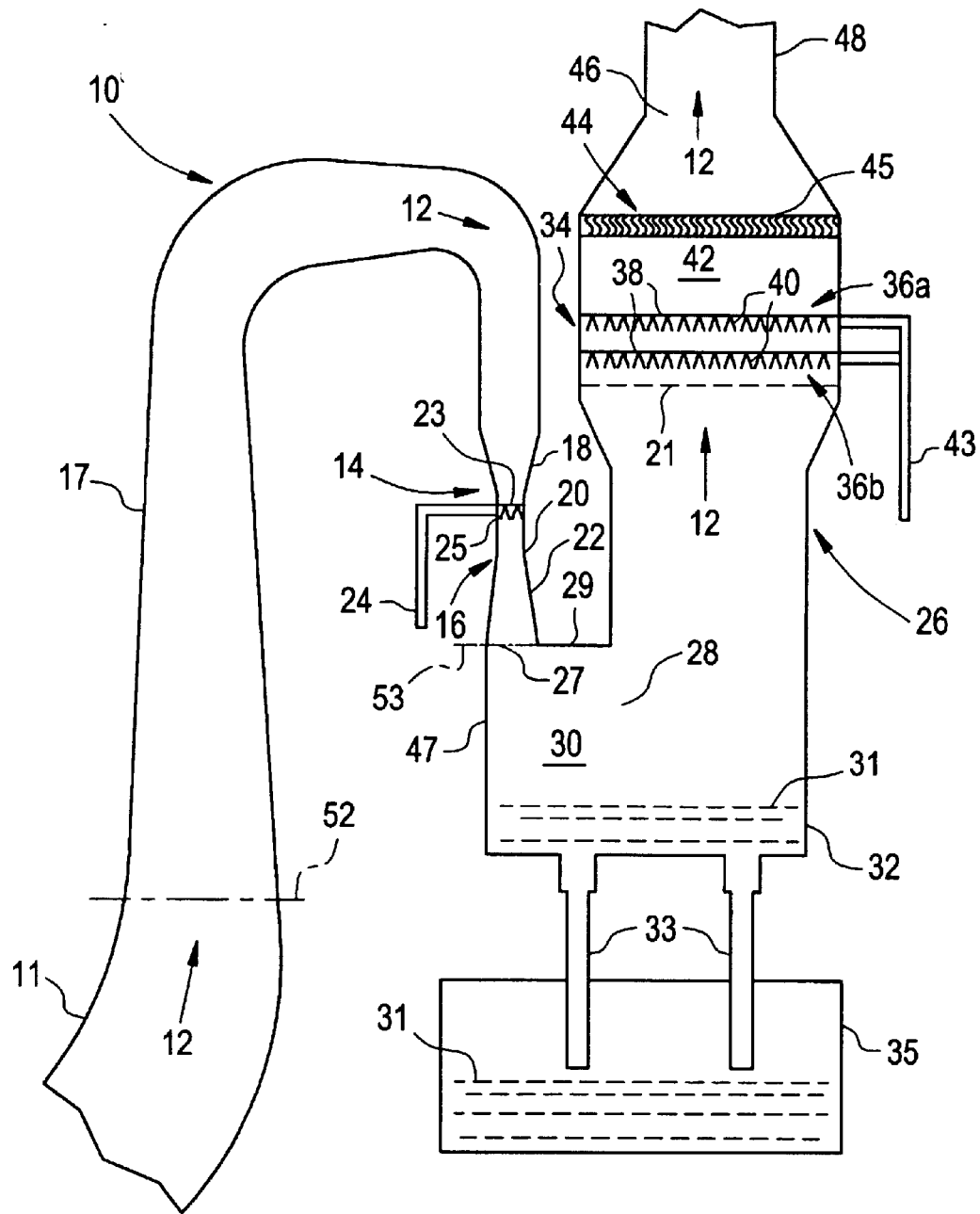
FIG.1 is a schematic sectional side view of a downflow/upflow WFGD system known in the art.

The present invention has preferred application to utility boiler flue gases which is the embodiment that will be described for purposes of illustrating the invention and its advantages. However, the invention is not limited to the illustrated embodiment, and effluents from all types of combustion sources, utilizing packed or other types of scrubbing apparatus, and a wide range of reagents in co-current and/or counter-current applications are envisioned.

Reference will hereinafter be made to the accompanying drawings wherein like reference numerals throughout the various figures denote like elements.

Referring now to the drawings, and particularly to FIG. 1, The downflow/upflow WFGD system 10, illustrated herein, is known in the art and embodies a flue gas duct 11 for receiving incoming flue gas 12, such as from a coal-fired utility or industrial boiler (not shown), and preferably cleaned of particulates such as by an electrostatic precipitator (not shown) or a fabric filter (not shown). The flue gas 12 is conveyed from the duct 11 by duct work 17, located between the cut points 52 and 53, and through the quencher 14 which is mounted in the duct work 17. The quencher 14 comprises a venturi scrubber 16, and as is known, venturi scrubber 16 is formed of an inlet cone 18, a throat 20 and an outlet cone 22.

As is also known, as the flue gas 12 travels through the venturi scrubber 16 it is accelerated by the reduced cross section of inlet cone 18 and throat 20, and it is then decelerated by the increased cross section of outlet cone 22. The process of accelerating and decelerating the flue gas flow facilitates interactions between the droplets of scrubbing fluid and the and acid gases particles in the flue gas 12, such that a portion of the contaminants particles are captured by the droplets and removed from the flue gas 12.

In the illustrative example, an alkaline slurry reagent is supplied via conduit 24 to the venturi scrubber 16 and sprayed into the flue gas stream through spray nozzles 25 mounted on spray headers 23. The nozzles 25 provide a uniform spray of relatively coarse droplets suspended in concurrent or cross-current contact with the flue gas 12 in the throat 20. The disposition of the sprays relative to the downwardly converging walls of the inlet cone 18 is such as to provide a wash along the lower regions of these walls to keep them relatively clean and to prevent the buildup of deposits on the wall surface.

After leaving the venturi scrubber 16, the flue gas, the sprayed slurry reagent and the captured contaminant particles flow co-currently downward and are discharged downwardly through the inlet opening 27 of a lateral passageway 30. The inlet opening 27 is located on the roof 29 of the passageway 30 and adjacent its front wall 47. The flue gas, the sprayed slurry, and the captured contaminant particles flow over and in contact with the slurry reagent and contaminants 31 collected in the reaction tank or sump 32. The slurry reagent and contaminants in the sump 32 are maintained at a desired or preset level with any excess slurry reagent and contaminants being discharged through downcomers 33 to a holding tank 35. The quenched and partially scrubbed flue gas 12 enters the absorber 26 through the inlet opening 28. Thus, the flue gas makes a 180° turn as it flows downwardly through the quencher 14, laterally through the passageway 30 and upwardly through the absorber 26. In its upward flow through the absorber 26, the flue gas 12 passes through a perforated tray 21 that promotes gas-liquid contact, and is generally of the type disclosed by the present applicant in U.S. Pat. No. 4,263,021. Thence, the flue gas 12 flows through a spray zone 34 that comprises spray levels 36a and 36b where additional gas-liquid contact is achieved. The spray levels 36a and 36b include spray nozzles 40 mounted on a set of headers 38. An alkaline slurry reagent is supplied to the headers 38 via manifolds, not shown, and conduit 43. A disengagement zone 42 is provided above spray level 36a before the flue gas 12 reaches the mist eliminator 44. The mist eliminator 44 is equipped with chevrons 45 to remove additional moisture from the flue gas 12. The scrubbed flue gas 12 leaves the mist eliminator 44 and exits from the absorber 26 through outlet 46 into the flue duct 48 for discharge through a stack (not shown).

Figure 2:
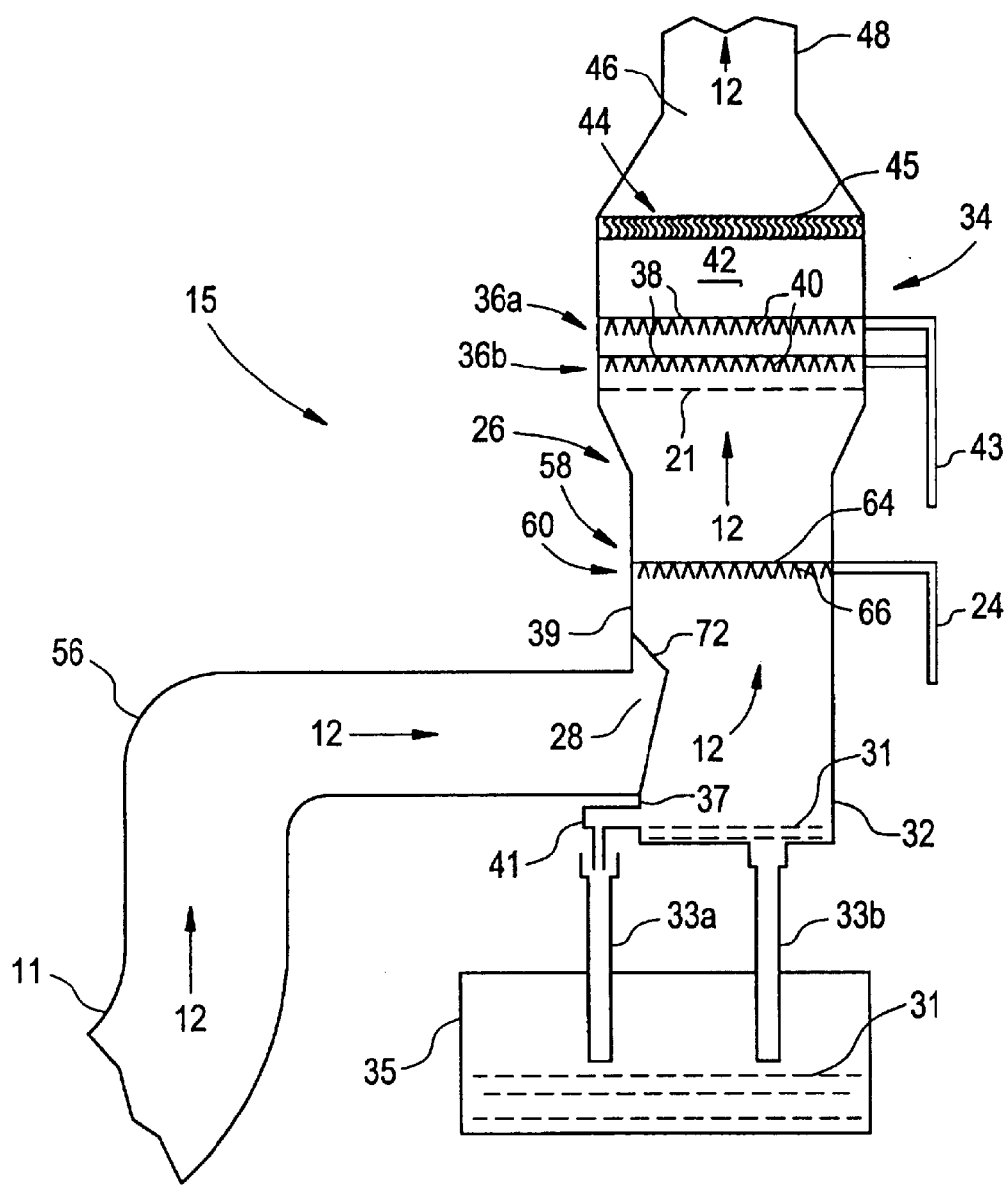
FIG. 2 is a schematic sectional side view of an upflow single-loop WFGD system derived from the system shown in FIG. 1 after utilizing a method according to the present invention.

In accordance with the present invention and with particular reference to FIG. 2, and as shown in FIG. 1, a duct section or duct work 17 is disconnected from the flue gas duct 11 at a cut point 52 and from the inlet 27 of the passageway 30 at a cut point 53. The duct work 17 which includes the quencher 14 is thus removed from operation as part of converting the downflow/upflow WFGD system 10 into an upflow single-loop WFGD system 15, shown in FIG. 2, and may be dismantled. As part of this conversion, and as shown in FIG. 2, a duct or bypass 56 is installed between flue gas duct 11 and the absorber 26. The bypass 56 has one end connected to the flue gas duct 11 at the cut point 52, shown in FIG. 1, and the other end connected to the portions of the absorber front wall 39 and the sump front wall 37 bordering on the inlet 28 of the absorber 26. The passageway 30, shown in FIG. 1, is thus removed from operation as part of the conversion, and may be dismantled. The bypass 56 receives the incoming flue gas 12 from the duct 11 and conveys it to the inlet 28 of the absorber 26.

Also as part of the conversion, the function performed by the quencher 14, shown in FIG. 1, is transferred to a quenching zone 58 located in the absorber 26 between spray level 36b and the inlet 28 of absorber 26. The quenching zone 58 consists of a spray level 60. The spray level 60 is comprised of a set of headers 64 and spray nozzles 66. An alkaline slurry reagent is supplied to the spray nozzles 66 through headers 64 via conduit 24 that is disconnected from the quencher 14, shown in FIG. 1, and rerouted and reconnected through a manifold (not shown) to the headers 64. Alternatively, a new conduit, not shown, may be installed to supply the alkaline slurry reagent to the spray nozzles 66.

Further as part of the conversion, an awning 72, generally of the type disclosed by the present applicant in U.S. Pat. No. 5,281,402, is mounted over the inlet 28 of the absorber 26 to prevent the slurry reagent from entering the bypass 56, and to initially deflect the flue gas 12 in a downward direction as it enters the absorber 26 so as to achieve better distribution of the flue gas 12 in its subsequent upward flow through the absorber 26. As it flows upwardly through the absorber 26, the flue gas 12 passes through a perforated tray 21 that promotes gas-liquid contact, and thence through a spray zone 34 that comprises spray levels 36a and 36b where additional gas-liquid contact is achieved. The spray levels 36a and 36b include spray nozzles 40 mounted on a set of headers 38. An alkaline slurry reagent is supplied to the headers 38 via manifolds, not shown, and conduit 43. The spray nozzles 40 produce a spray of relatively coarse droplets suspended in countercurrent contact with the flue gas 12 for several seconds. A majority of the sulfur dioxide absorption from the flue gas occurs during this short contact time. A disengagement zone 42 is provided above spray level 36a before the flue gas 12 reaches the mist eliminator 44. The purpose of the zone 42 is to allow disengagement and return of the largest slurry droplets by gravity to the spray zone 34. The mist eliminator 44 design in most wet scrubbers uses chevrons 45 to remove additional moisture from the flue gas 12. Chevrons 45 are closely spaced corrugated plates that collect slurry deposits by impaction. The scrubbed flue gas 12 leaves the mist eliminator 44 and exits from the absorber 26 through outlet 46 into the flue duct 48 for discharge through a stack (not shown). Because the flue gas 12 leaving the absorber 26 is saturated with water vapor, surface condensation is inevitable. This condensate can become severely acidic and calcium salts can deposit on the walls. Two approaches are used to minimize these effects, flue gas reheat (not shown), and flue duct and stack lining (not shown). In the latter approach, the flue duct 48 is lined with corrosion resistant materials, and the stack is lined with acid resistant brick or other suitable material. A drainage system (not shown) is also included to accommodate the condensed water vapor.

Additionally as part of the conversion, the front wall 39 of the absorber 26 is extended below the inlet 28 of the absorber 26 and becomes the front wall 37 of the sump 32. An overflow conduit 41 is added to the front wall 37 of the sump 32 to maintain a desired or preset level of slurry reagent spent slurry and contaminant particles 31 in the sump 32, with any excess slurry reagent and contaminants 31 being discharged through downcomers 33a and 33b to the holding tank 35.

Figure 3:
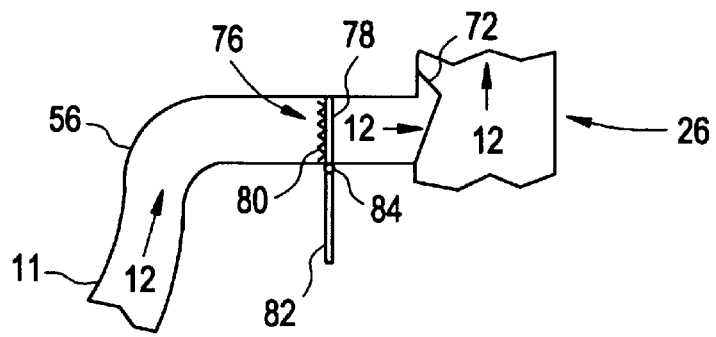
FIG. 3 is a schematic sectional side view of an alternate embodiment of the present invention, and depicts an emergency quencher mounted in the bypass.

Turning now to FIG. 3, there is shown an alternate embodiment depicting fragmented portions of the flue gas duct 11 and the absorber 26, the bypass 56, the awning 72, and the direction of flow of the flue gas 12 through the duct 11, the bypass 56 and the absorber 26. In accordance with this embodiment, a standby quencher 76 is mounted in the bypass 56 for emergency use. For example, the quencher 76 may consist of a set of headers 78 and spray nozzles 80. An alkaline solution or water is supplied via conduit 82 to a manifold 84 and thence through headers 78 to the spray nozzles 80. Control apparatus, not shown, may be provided to automatically activate the standby quencher 76 whenever the flue gas 12 being conveyed through the bypass 56 exceeds a desired or preset temperature.

Figure 4:
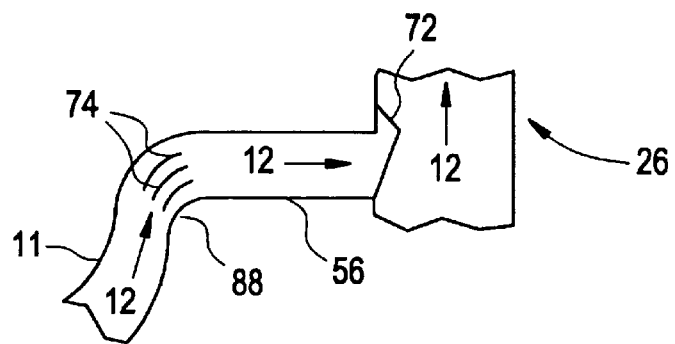
FIG. 4 is a schematic sectional side view of another alternate embodiment of the present invention, and depicts turning vanes mounted in the bypass.

In FIG. 4, there is shown another alternate embodiment of the present invention depicting fragmented portions of the flue gas duct 11 and the absorber 26, the bypass 56, the awning 72, and the direction of flow of the flue gas 12 through the duct 11, the bypass 56 and the absorber 26. In accordance with this embodiment, flow guiding means in the form of turning vanes 74 are mounted in the corner 88 of bypass 56 to direct the flow of flue gas 12 around the corner 88 and to promote uniform flow of the flue gas 12 and thus reduce the pressure drop across the bypass 56 by reducing the turning losses at the corner 88.

Figure 5:
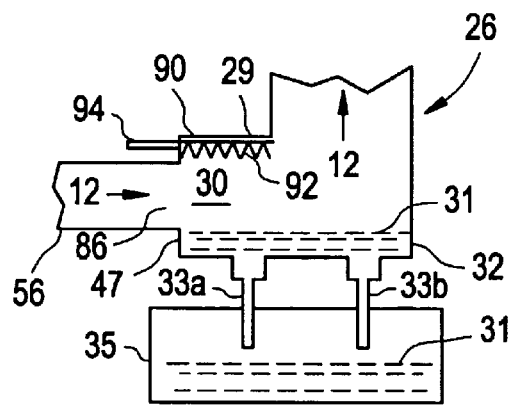
FIG. 5 is a schematic sectional side view of a further alternate embodiment of the present invention, and depicts the bypass connected to the lateral passageway.

In FIG. 5, there is shown a further alternate embodiment of the present invention depicting fragmented portions of the bypass 56 and the absorber 26, and the direction of flow of the flue gas 12 through the bypass 56 and the absorber 26. In accordance with this embodiment, the bypass 56 does not replace the lateral passageway 30 of FIG. 1, instead, it discharges the flue gas 12 into passageway 30 which then conveys it to the absorber 26. The retained passageway 30 has been restructured to include the closing of the inlet opening 27 located in the roof 29 of passageway 30 and shown in FIG. 1, or the installation of a new roof without an inlet opening, and the making of an inlet opening 86 in the front wall 47 of passageway 30 to receive the flue gas 12 being discharged from the bypass 56 which is connected to the portion of the front wall 47 bordering the opening 86. A set of headers 90 and spray nozzles 92 may have to be added to the gas side of the roof 29, as part of the restructuring of passageway 30, to prevent the flue gas 12 from overheating the roof 29. An alkaline solution is supplied by a conduit 94 through a manifold, not shown, and thence through headers 90 to the spray nozzles 92. Control apparatus, not shown, may be provided to create a shield of alkaline spray protecting the roof 29 whenever the flue gas exceeds a desired or preset temperature. The flue gas 12 entering the passageway 30 flows over and in contact with the slurry reagent and contaminants 31 collected in the sump 32. The excess slurry reagents and contaminants 31 in the sump 32 are discharged through downcomers 33 into the holding tank 35.

Figure 6:
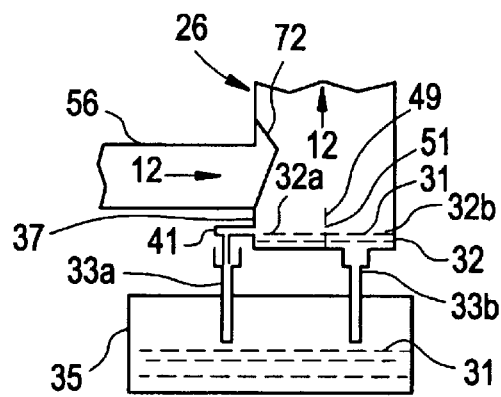
FIG. 6 is a schematic sectional side view of still another alternate embodiment of the present invention, and depicts an arrangement for accommodating a partitioned sump.

In FIG. 6, there is shown still another embodiment of the present invention depicting fragmented portions of the bypass 56, the awning 72 and the absorber 26, and the direction of flow of the flue gas 12 through the bypass 56 and the absorber 26. In accordance with this embodiment, the sump 32 is divided into sections 32a and 32b. The partition 49 that divides the sump 32 into sections 32a and 32b is provided with an opening 51 which enables excess slurry reagent and contaminants 31 in section 32b, beyond that being discharged through downcomer 33b to the holding tank 35, to flow from section 32b to section 32a and thence through the overflow conduit 41 located in the front wall 37 of the sump 32. The excess slurry agent and contaminants 31 are discharged from the overflow conduit 41 through downcomer 33a into the holding tank 35.

Although the present invention has been described above with reference to particular means, materials and embodiments, it is to be understood that this invention may be varied in many ways without departing from the spirit and scope thereof, and therefore is not limited to these disclosed particulars but extends instead to all equivalents within the scope of the following claims.

We claim:

1. A method of reducing the pressure drop in a downflow/upflow flue gas desulfurization system by converting the downflow/upflow system to a single-loop flue gas desulfurization system, the method comprising the steps of:

providing a downflow/upflow flue gas desulfurization system having a downflow quencher and an upflow absorber, a lateral passageway located between the quencher and the absorber, means for supplying working fluid to the quencher, the absorber having a flue gas inlet, at least one sump located below the passageway and the absorber, duct work for conveying incoming flue gas to the passageway, the quencher being mounted in the duct work;

replacing the duct work with a bypass;

adding spray means above the absorber inlet; and supplying working fluid to the spray means.

2. The method as recited in claim 1, further including the step of extending the bypass to the absorber inlet.

3. The method as recited in claim 2, wherein the lateral passageway has a roof, and further including the step of adding spray means between the passageway and the roof.

4. The method as recited in claim 1, further including the step of replacing the passageway with the bypass.

5. The method as recited in claim 1, further including the step of reducing the pressure drop by about 5 inches water gage.

6. The method as recited in claim 1, wherein the step of supplying working fluid to the spray means includes redirecting the working fluid from the quencher to the spray means.

7. The method as recited in claim 1, further including the step of placing a perforated tray below the spray means.

8. The method as recited in claim 1, further including the step of providing the absorber with an awning over the flue gas inlet.

9. The method as recited in claim 1, further including the step of mounting a standby quencher in the bypass.

10. The method as recited in claim 1, further including the step of configuring the bypass with a lesser number of turns than the duct work.

11. The method as recited in claim 1, further including the step of mounting guiding means in the bypass to promote the flow of flue gas therethrough.

12. The method as recited in claim 1, further including the step of adding wall means at the inlet side of the absorber to accommodate the bypass.

13. The method as recited in claim 10, further including the step of providing a sump overflow conduit through the wall means.

14. The method as recited in claim 11, further including the step of placing the sump overflow conduit below the absorber inlet.

15. The method as recited in claim 11, wherein partition means divide the sump into separate sections, and further including the step of providing an opening through the partition means.

* * * * *